United States Patent [19]

MacAndrew et al.

[11] Patent Number: 6,024,405
[45] Date of Patent: Feb. 15, 2000

[54] HEAD RESTRAINT ASSEMBLY

[75] Inventors: Kenneth Douglas MacAndrew, Kenilworth; Paul Sharman, Coventry, both of United Kingdom

[73] Assignee: Rover Group Limited, Warwick, United Kingdom

[21] Appl. No.: 09/198,418

[22] Filed: Nov. 24, 1998

[30] Foreign Application Priority Data

Dec. 12, 1997 [GB] United Kingdom .................... 9726298

[51] Int. Cl.$^7$ .................................................. B60N 2/42
[52] U.S. Cl. ...................................... 297/216.12; 297/408
[58] Field of Search ....................................... 297/391, 408, 297/216.12

[56] References Cited

U.S. PATENT DOCUMENTS

| | | | |
|---|---|---|---|
| 3,186,673 | 6/1965 | Ferrara | 287/216.12 |
| 3,547,486 | 12/1970 | Herzer | 297/408 |
| 3,655,241 | 4/1972 | Herzer et al. | 297/408 |
| 4,600,240 | 7/1986 | Suman et al. | 297/408 |

FOREIGN PATENT DOCUMENTS

| | | |
|---|---|---|
| 0 627 340 A1 | 12/1994 | European Pat. Off. . |
| 0 825 061 A2 | 2/1998 | European Pat. Off. . |
| 25 08 645 | 9/1976 | Germany . |
| 2508645 | 9/1976 | Germany ............................ 297/408 |
| 27 19 830 | 11/1978 | Germany . |
| 196 28 609 A1 | 3/1997 | Germany . |
| 2 106 380 | 4/1983 | United Kingdom . |

*Primary Examiner*—Anthony D. Barfield
*Attorney, Agent, or Firm*—Davis and Bujold

[57] ABSTRACT

A head restraint assembly 10 is disclosed having an adjustable head restraint member 11 which is securable in position between a forward position and a rearward position by a helical coil locking member 14. The locking member 14 is, in a normally relaxed state, of smaller internal diameter than the external diameter of a transverse support rod 24 with which it is engaged. By rotation of one end portion 19 of the locking member 14 with respect to the other end portion 21 the locking member 14 is partially unwound thereby releasing its locking grip on the support rod 24.

6 Claims, 1 Drawing Sheet

HEAD RESTRAINT ASSEMBLY

FIELD OF THE INVENTION

This invention relates to seat assemblies and in particular to a seat assembly having a movable head restraint and means for securing said head restraint in a pre-determined fore-aft position.

BACKGROUND OF THE INVENTION

It is known from GB-A-2106380 to provide a head restraint for a motor vehicle seat that can be automatically swung into an extreme forward position under the force of inertia acting on the head restraint when the vehicle is subject to severe deceleration.

It is a disadvantage with such a prior art arrangement that the mechanism required to achieve said function is complicated and therefore relatively expensive to manufacture.

It is an object of this invention to provide an improved head restraint assembly for a motor vehicle.

BRIEF SUMMARY OF THE INVENTION

According to the invention there is provided a head restraint assembly comprising an attachment means for attaching a head restraint member to a structural part of a motor vehicle, the head restraint member being pivotally connected to a transverse rod forming part of said attachment means for movement between a forward and a rearward position, the head restraint having a padded headrest member covering a support member and a securing means to hold the head restraint during normal use in any position between said forward and rearward positions but being arranged to allow movement of the head restraint towards said forward position under the force of inertia acting on the head restraint member when the vehicle is subject to severe deceleration wherein the securing means comprises a helical coil locking member engaged with a transverse support rod forming part of said support member, said locking member having an internal diameter that in the relaxed state is less than the diameter of the transverse support rod and having a first end portion for abutment against part of said attachment means and a second end portion extending to form a release lever such that upon rotation of the second end portion in a pre-determined direction the internal diameter of the coil locking member is increased so as to reduce the gripping effect on the transverse support rod with which it is engaged thereby allowing the head restraint member to be rotated relative to the attachment means.

The structural part of the motor vehicle may be a backrest portion of a seat.

The attachment means may comprise at least one rod for engagement with the backrest portion of the seat to the or each of which is attached at its upper end a bearing member used to pivotally connect the head restraint member to the attachment means.

The first end of the helical locking member may be engaged with an aperture in the bearing member.

There may be two rods each of which has a bearing member attached thereto.

The first end of the helical locking member may be engaged with an aperture in one of the bearing members.

There may be two helical locking member engaged with the support rod to hold the head restraint in position.

The two helical locking member may be wound in opposite directions.

A spring may be interposed between the attachment means and the head restraint member to urge the head restraint in a rearward direction.

The support member is a peripheral frame of which the transverse support rod forms a part.

BRIEF DESCRIPTION OF THE DRAWING

The invention will now be described by way of example with reference to the accompanying drawing of which.

DESCRIPTION OF THE INVENTION

Figure 1:
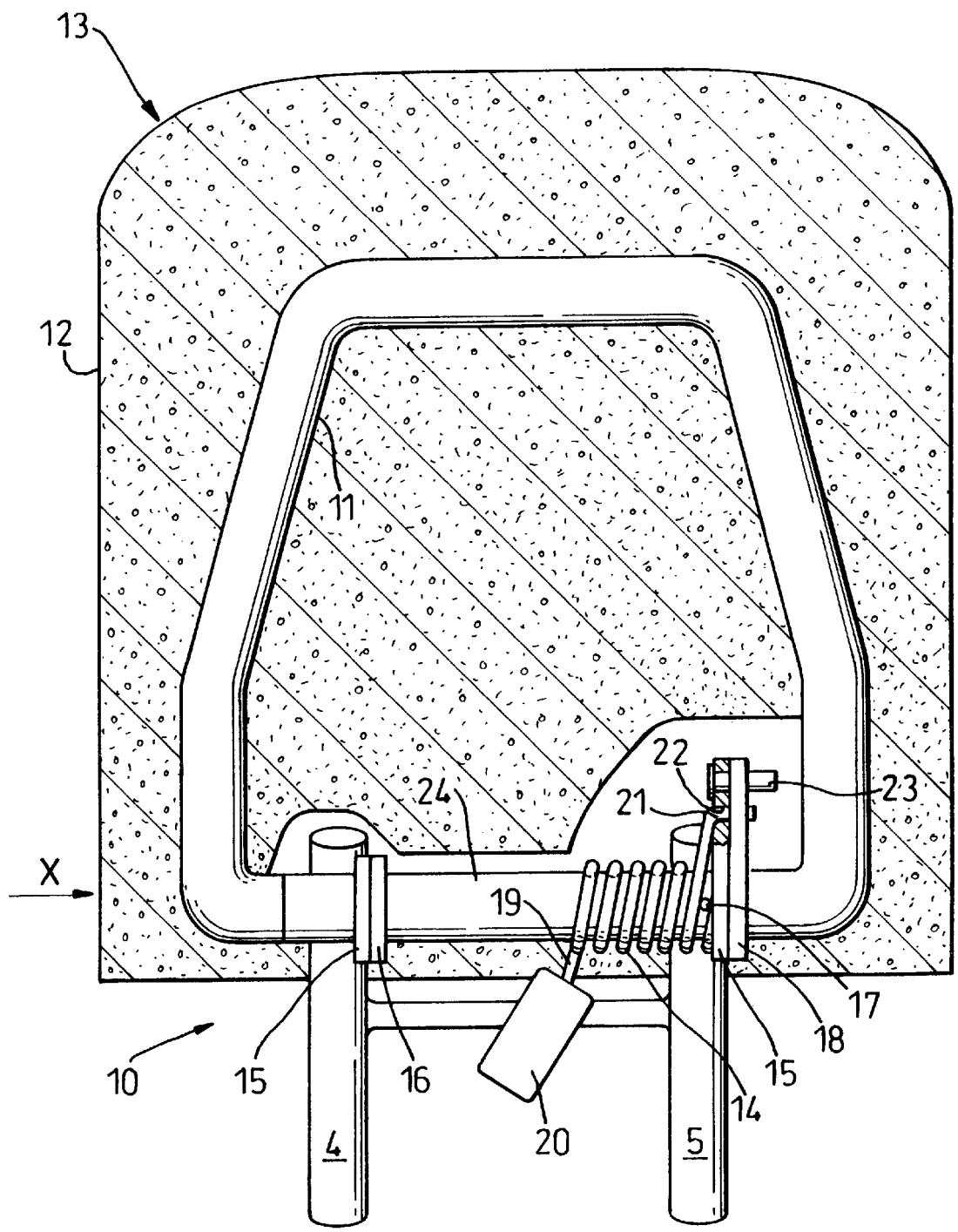
FIG. 1 is a front view of part of a head restraint assembly according to the invention.

With reference to the drawing there is shown a head restraint assembly 10 comprising a head restraint member 13 pivotally connected to an attachment means in the form of two downwardly projecting rods 4, 5.

The head restraint member 13 comprises a foam filled headrest 12 and a support frame 11 which is pivotally connected to the rods 4, 5 for movement between a forward position and a rearward position. The support frame 11 has a transverse support rod 24 which is engaged with a pair of spaced apart bearing plates 15 each of which is secured to a respective one of the downwardly projecting rods 4, 5. To control end float of the transverse support rod 24 with respect to the bearing plates 15 an end stop plate 16 is attached to the transverse support rod 24 in a position adjacent to one of the bearing plates 15 and an end float control pin 17 is press fitted into an aperture in the transverse support rod 24 at a position adjacent to the other of said bearing plates 15.

An archimedean spiral spring 18 is interposed between one of the bearing plates 15 and the transverse support rod 24. The inner end of said spring 18 being engaged with a slot (not shown) in the transverse support rod 24 and the outer end of the spring 18 being in abutment with a pin 23 extending out from an aperture in one of the bearing plates 15. The spring 18 is so arranged that it will bias the head restraint member in a rearward direction.

To hold the head restraint member 13 in any position between forward and rearward positions during normal use a securing means in the form of a helical coil locking member 14 is engaged with the transverse support rod 24. The locking member 14 is, in a normally relaxed state, of a smaller internal diameter than the external diameter of the transverse support rod 24 with which it is engaged. A first end portion 21 of the locking member 14 extends away from the transverse support rod 24 and is engaged in an aperture 22 in one of the bearing plates 15. A second end 19 of the locking member 14 extends away from the transverse support rod 24 and has a plastic handle 20 moulded thereon. The arrangement of the locking member 14 is therefore such that it acts as a clutch between the transverse support rod 24 and the bearing plate 15 with which its first end portion is engaged. The gripping force exerted by the locking member 14 is such that during normal use the head restraint member 13 is maintained in any position between its most forwardly and most rearwardly positions. However if the vehicle undergoes a severe deceleration then the inertia of the head restraint member which has a centre of gravity will force slippage to occur between the transverse support rod 24 and the locking member 14. This allows the head restraint member 13 to move forwardly thereby in some manner mimicking the forward motion of an occupants head during such a deceleration.

During normal use the locking member 14 can be released by applying force to the handle 20 in such a direction that it tends to unwind the locking member 14 thereby increasing the internal diameter of the locking member 14 and releasing its grip upon the transverse support rod 24. This allows the spring 18 to bias the head restraint member 13 rearwardly so long as the releasing force is applied to the handle 20. As shown in FIG. 1 if viewed from the direction 'X' the handle 20 will need to be rotated in a counter clockwise direction to release the gripping load of the locking member 14.

To adjust the head restraint member 13 from its most rearward position to a more forward position an occupant of the vehicle merely needs to apply a load to the head restraint member 13 in a forward direction of sufficient magnitude to overcome the locking member 14.

It will therefore be seen that in a very simple and efficient manner a locking member has been provided that allows both adjustment of the head restraint member 13 during normal use and, in the event of a severe deceleration, permits the head restraint member 13 to move forwardly to assist with the reduction of whiplash injuries. It will also be appreciated that the locking member 14 is not released by the forward movement of the head restraint member 13 as its first end portion 21 is engaged with a stationary bearing plate 15 and not a moving part.

It will be appreciated that instead of one locking member 14 there could be two locking members engaged with the transverse support rod 24 in which case the second locking means would be a mirror image of that shown in FIG. 1 having a helical locking member that is wound in an opposite direction to that shown.

Although the head restraint assembly has been described with reference to a head restraint having a peripheral frame, it will be appreciated that such a frame is not an essential element of the head restraint. It could, for example, be made from a resilient plastics material but in this case it may be necessary to include a weight to the headrest assembly which is offset from its axis of pivoting to produce sufficient inertia to overcome the holding force of the locking member.

It will also be appreciated that the headrest assembly could be attached to a structural part of the vehicle if fitted to a rear seat of a motor vehicle.

We claim:

1. A head restraint assembly comprising:
    a head restraint member including a padded headrest member incorporating a securing means and a support member having a transverse rod; and
    attachment means for coupling the head restraint assembly to a structural part of a motor vehicle;
    the head restraint member being secured to the attachment means by the securing means by way of the transverse rod, and the head restraint member being pivotally moveable about the transverse rod between a forward position and a rearward position, the securing means being configured to grip the head restraint member in any position between the forward position and the rearward position but the head restraint member having a gravitational bias towards the forward position whereby the head restraint member moves towards the forward position when the head restraint member is subjected to a predetermined force of inertia sufficient to overcome the grip between the securing means and the transverse rod;
    and the securing means comprising a helical coil lock member located about the support member, the lock member having a first end portion and a second end portion, the lock member between the first end portion and the second end portion having a relaxed internal diameter, smaller than a diameter of the transverse rod, for gripping the transverse rod by interference engagement, in order to securely grip the head restraint member at any position between the forward position and the rearward position, the first end portion being in abutment with the attachment means in order to anchor the lock member, and the second end portion extending to form a release lever;
    wherein the attachment means is configured to be coupled to a backrest portion of a seat, as the structural part of a motor vehicle; and
    the attachment means includes at least one rod for engagement with the backrest portion of the seat, and a bearing member is attached to the at least one rod at its upper end for pivotally connecting the head restraint member to the attachment means;
    whereby the grip between the lock member and the transverse rod can be released by displacement of the release lever to increase the internal diameter of the lock member for movement of the restraint member between the forward position and the rearward position whilst the grip between the lock member and the transverse rod is overcome by the gravitational bias of the head restraint member when subjected to the predetermined force of inertia.

2. A head restraint assembly as claimed in claim 1 wherein the first end portion of the helical locking means is engaged with an aperture in the bearing member.

3. A head restraint assembly as claimed in claim 1 wherein there are two rods each of which has a bearing member attached thereto.

4. A head restraint assembly as claimed in claim 3 wherein the first end of the helical locking means is engaged with an aperture in one of the bearing members.

5. A head restraint assembly as claimed in claim 1 wherein a spring is interposed between the attachment means and the head restraint member to urge the head restraint in the rearward direction.

6. A head restraint assembly as claimed in claim 1 wherein the support member is a peripheral frame of which the transverse support rod forms part.

* * * * *